United States Patent [19]

Steiner

[11] 4,091,799

[45] May 30, 1978

[54] SELF-TRACKING RADIANT ENERGY COLLECTOR

[75] Inventor: Robert E. Steiner, Creve Coeur, Mo.

[73] Assignee: Emerson Electric Co., St. Louis, Mo.

[21] Appl. No.: 776,306

[22] Filed: Mar. 10, 1977

[51] Int. Cl.$^2$ .................................................. F24J 3/02
[52] U.S. Cl. ...................................... 126/271; 126/270
[58] Field of Search ................ 126/270, 271; 136/206, 136/89 PC

[56] References Cited

U.S. PATENT DOCUMENTS

| 1,951,404 | 3/1934 | Goddard | 126/270 |
| 3,982,526 | 9/1976 | Barak | 126/270 |
| 3,996,917 | 12/1976 | Trihey | 126/271 |
| 4,044,752 | 8/1977 | Barak | 126/270 |

*Primary Examiner*—Carroll B. Dority, Jr.
*Attorney, Agent, or Firm*—Polster, Polster and Lucchesi

[57] ABSTRACT

A solar energy conversion device is provided with simplified means for tracking a source of solar energy. In the preferred embodiment, the tracking means is a predeterminedly shaped, heat expandable device operatively connected to an energy concentrator. The energy concentrator is movably mounted and is adapted to direct concentrated energy either towards a suitable energy conversion means in those positions in which the concentration is aligned with respect to the solar energy source, or towards the expandable device in those positions in which the concentrator is disaligned with respect to the solar energy source. Application of concentrated solar energy to the expandable device causes its expansion, which expansion is utilized to move the concentrator into alignment with the energy source. At alignment, concentrated energy is directed from the expandable device toward the energy conversion means.

21 Claims, 10 Drawing Figures

4,091,799

SELF-TRACKING RADIANT ENERGY COLLECTOR

BACKGROUND OF THE INVENTION

This invention relates to electromagnetic energy collection, and more particularly, to devices useful in the collection and utilization of radiant energy from solar sources. While the invention is described with particular emphasis in respect to its solar energy source collection application, those skilled in the art will recognize the wider applicability of the inventive principles disclosed hereinafter.

The prior art reveals a number of the devices adapted to concentrate available solar energy and convert that energy to perform useful work. In general, the concentrators may be classified as stationary or movable devices. Stationary devices either are moved manually to follow the energy source, or have special physical constructions which enables the device to gather some percentage of the available solar radiation regardless of the position of the sun, without physical movement of the concentrator. In the last mentioned case of the stationary concentrator, rather elaborate and complex reflector or lens designs are necessary in order to permit the stationary concentrator to accomplish its function.

Prior art concentrators which track the sun, on the other hand, as a class generally use complex electrical and mechanical devices to accomplish the tracking function. For example, photo cells and associated circuits and drivers commonly are employed for this purpose. At their present stage of development, known devices for tracking and concentrating the energy of the sun are relatively expensive to manufacture and maintain.

The invention disclosed hereinafter eliminates these prior art deficiencies by providing a low-cost means and method for tracking solar movement. In the preferred embodiment, tracking is provided by a serpentine shaped expanding means, preferably a bimetal, connected to a concentrator and adapted to receive concentrated energy from the concentrator in disaligned positions of the concentrator, so that it expands and drives the concentrator toward alignment with a solar source. At alignment, the concentrated energy is directed toward a suitable energy conversion means. The bimetal shape utilized for tracking, being temperature or radiant energy sensitive, continually interacts with the available energy supply so that the concentrator follows the energy source, once alignment is attained. For the purposes of this specification, the term "serpentine" is defined to mean the shape given an expanding means so that the expanding means gives relatively large movement with relatively small energy input at an aligned point of maximum energy concentration of the concentrator in order to hold the concentrator in alignment with the energy source while using only a small portion of the available energy; the shape of the expanding means at points other than the aligned point of maximum energy concentration being such as to receive energy from the concentrator, thereby causing the expansion means to move the concentrator back toward the aligned point of maximum energy concentration.

One of the objects of this invention is to provide a low-cost energy conversion device.

Another object of this invention is to provide a simplified device for tracking a source of radiant energy.

Still another object of this invention is to provide a source trackable solar concentrator driven by a suitable heat expandable device.

Yet another object of this invention is to provide a predeterminedly formed expansion device operatively connected to a concentrator of solar energy which is adapted to position the concentrator properly with respect to the solar energy source.

Other objects of this invention will be apparent to those skilled in the art in light of the following description and accompanying drawings.

SUMMARY OF THE INVENTION

In accordance with this invention, generally stated, an energy concentrator is provided with simplified, temperature or radiant energy responsive positioning means which function to move the concentrator into alignment with a source of radiant energy. In the preferred embodiment, the concentrator is a Fresnel lens pivotally mounted about an energy reception area. The lens is adapted to concentrate radiant energy on the reception area when the lens is aligned properly with an energy source, conventionally the sun. An expansion means is operatively connected to the lens and is positioned so that the lens directs concentrated energy on the expansion means when the lens is not aligned with the energy source. The particular expansion means of the preferred embodiment is predeterminedly shaped so that at alignment, the expansion means may respond to thermal or radiant energy changes, thereby maintaining the aligned position of the lens and the energy source. Pluralities of individual concentrators may be arranged to form energy collectors. The energy made available from both the individual concentrators or the energy collectors can be used directly or it can be converted to another form.

DESCRIPTION OF THE PREFERRED EMBODIMENT

Figure 1:
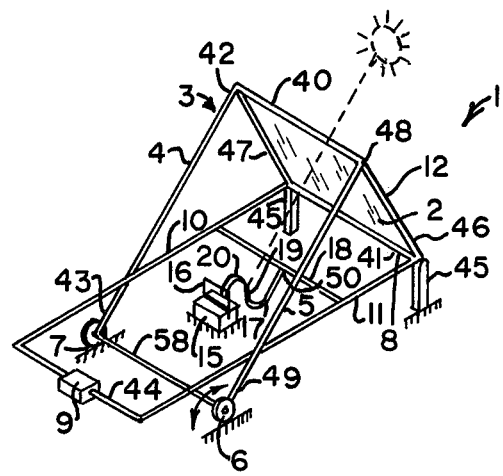
FIG. 1 is a diagrammatic view in perspective, showing one illustrative embodiment of energy concentrator of this invention.

Referring now to FIG. 1, reference numeral 1 indicates one illustrative embodiment of energy conversion device of this invention. The device 1, shown somewhat diagrammatically in FIG. 1, includes an energy concentrator or concentrating means 2 carried in a frame 3.

The concentrating means 2 preferably is an energy focusing lens, although those skilled in the art will recognize that a reflector focusing element may be utilized in place of the lens focusing device shown, merely by redesigning various structural components of the invention. Preferably, the concentrator 2 is a Fresnel lens of a known, flat panel design. The flat panel design is preferred because it permits the construction of a physically smaller radiant heater 35, shown in FIG. 6 and described in greater detail hereinafter, than permitted with other known lens or reflector designs. However, other concentrators are compatible with the broader aspects of my invention. For example, the concentrator 2 may comprise several panels of Fresnel devices arranged as the sides of a pyramid. Or, the concentrator 2 may comprise a conical Fresnel device which does not have flat panels. Conical Fresnel designs are not as deeply bowed in conical shape as other conical lens designs, but have increased efficiency because of the elimination of shadowing inherent in the flat Fresnel panel constructions.

The concentrator means 2 is mounted within the frame 3 by any convenient method. In the embodiment of FIG. 1, the frame 3 is rectangular in plan, having oppositely opposed side pairs 40, 41 and 46, 47, respectively, surrounding the concentrator means 2. Individual ones of the sides may be joined to one another by any convenient method. Either mechanical interlocking techniques or some form of welding works well, for example. A pair of support arms 4 and 5 are attached to the side 40 of frame 3 along an end 42 and an end 48 of the respective arms 4 and 5. The arms 4 and 5 are mounted for rotation, as generally indicated at pivots 6 and 7, along respective ends 43 and 49 of the arms. A cross member 58 may be used to add structural rigidity between the arms 4 and 5, if desired.

A lower edge 8 of the side 41 of the frame 3 has a pair of supports 10 and 11, respectively, attached to it. A cross member 44 extends between the support pair 10 and 11, on an end of the support pair opposite their attachment with the edge 8. A counter-weight 9 is mounted to the member 44 and functions to counterbalance the weight of the concentrator 2 about the pivots 6 and 7. The counter-weight 9 was used in conjunction with the embodiment of FIG. 1 because the size and weight of the concentrator means 2 tends to cause the concentrator means 2 to drop against a stop 45 with such force as to damage the concentrating means when the energy source passes beyond the movement limits of the device 1. Other embodiments of my invention may not require the use of the counter-weight 9.

Figure 2:
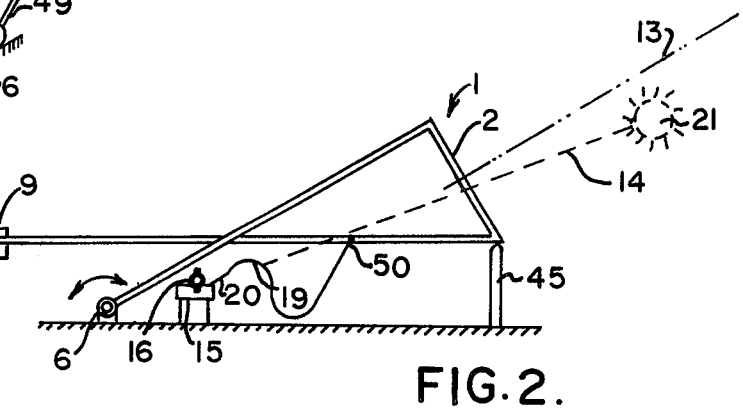
FIG. 2 is a view in side elevation of the energy concentrator of this invention, shown in a disaligned position.

The concentrating means 2 has a front face 12 and a focusing axis, indicated generally by the numeral 13 in FIG. 2. Commonly, the axis 13 is normal to the face 12, although the location of the axis 13 with respect to the face 12 has not been found critical in present embodiments of the invention, and other focusing axes arrangements are compatible with the broader aspects of this invention. As indicated above, a Fresnel lens is utilized for the concentrator means 2. The Fresnel lens or Fresnel reflector has the advantage of being essentially flat, thereby permitting the construction of a device having relatively small physical dimensions, although various configurations used in Fresnel designs may require some depth in order to increase the efficiency of the lens or reflector due to the shadowing effect prevalent in flat Fresnel lens constructions.

The concentrating means 2 is adapted to focus incoming radiant energy rays, indicated generally by the numeral 14, toward a concentrating area 15. The concentrating area 15 has a suitable conversion means 16 associated with it. The conversion means 16 converts the radiant energy to another, more useable form. Thus, conversion means 16 may be a pipe carrying a liquid which is heated by the energy rays at the area 15. Or, the conversion means 16 may be a photoelectric device, for example, which converts the incoming energy to electrical energy. In turn, the electrical energy may be stored in suitable storage means, not shown, or it may be used immediately.

A cross bar 18 is connected between the supports 10 and 11 and is attached thereby by any convenient method at some predetermined point along the longitudinal length of the supports 10 and 11, between the concentrating area 15 and the concentrator means 2. An expansion means 17 is operatively connected between the concentrating area 15 and the cross bar 18. The expansion means 17 preferably is constructed from a bimetallic material. However, other suitable expansion devices are compatible with the broader aspects of this invention.

The expansion means 17 has a first end 20, a second end 50, and a generally serpentine design therebetween. The overall design of the expansion means 17 includes a curved portion 19 near the end 20, which is important in the overall tracking ability of the device 1. The end 20 of the expansion means 17 is attached to the device 1 at the concentrating area 15, while the end 50 is attached to the cross bar 18. As indicated, the particular shape of the expansion means 17 is important, as is later described in greater detail.

Figure 7:
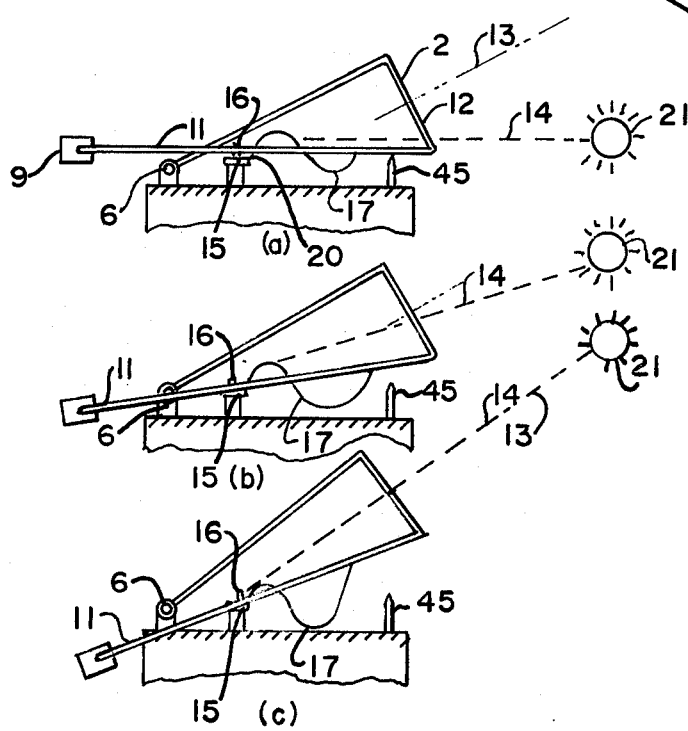
FIG. 7 is a series of diagrammatic views demonstrating the operation of the positioning means utilized with the embodiments of this invention.
Figure 8:
FIG. 8 is a view in perspective of one illustrative embodiment of positioning means utilized with the concentrator of FIG. 1.

Operation of the concentrating means 2 is relatively simple and may be best understood with reference to FIG. 7. The device 1 is positioned so that it faces a source of radiant energy 21 which conventionally is the sun. As the sun or energy source 21 comes above the horizon, as illustrative radiant energy ray 14 impinges the face 12 of the concentrating means 2. The use of a single energy ray 14 is a simplification made for the purpose of explanation. As indicated above, when the ray 14 is aligned, that is, parallel to the axis 13, the ray 14 passes through the concentrator 2 and is directed at the concentrating area 15, and in particular, towards the conversion means 16. Whenever the ray 14 is not aligned with the axis 13, the concentrating means 2 directs concentrated energy towards the expansion means 17. A non-aligned position is illustrated in FIGS. 2 and 7a. As the concentrated energy strikes the expansion means 17, it begins to expand. Since the end 20 of the expansion means 17 is fixed at the concentrating area 15, expansion of the expansion means 17 exerts an upward force on the device 1 because of the interconnection of the end 50 at the cross bar 18, upward being referenced to FIG. 7. That force drives the device 1 counterclockwise, again referenced to FIG. 7, about the pivots 6 and 7. The energy ray 14 continues to move or walk along the curved portion 19 until it passes over the top of the curved portion 19. At that point, the energy ray 14 strikes the conversion means 16.

I have found that some hunting takes place at the initial capture of the energy source 21 by the device 1. That is to say, the expansion means 17 continues to expand after the energy ray 14 passes over the top of the curved portion 19, so that the expansion means 17 begins to contract, lowering the concentrating means 2 until the energy ray 14 again strikes the expansion means 17. This process repeats itself until an equilibrium position is reached. At equilibrium, the energy ray 14 is approximately tangent to the curved portion 19 of the expansion means 17, so that it strikes the concentrating area 15 but still enables the expansion means 17 to expand at a rate sufficient to permit the device 1 to track the energy source 21. Stops, not shown, may be used, if desired, to restrict device 1 movement in any given direction.

Figure 4:
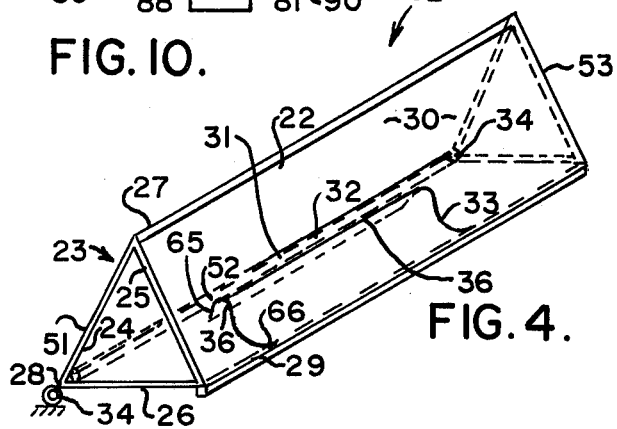
FIG. 4 is a view in perspective of one illustrative embodiment of an energy collector.
Figure 5:
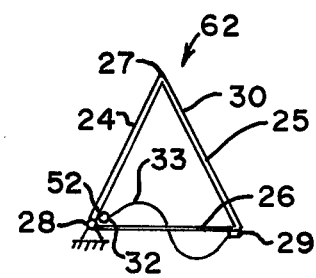
FIG. 5 is a view in side elevation of the energy collector shown in FIG. 4.

A variation of the device 1 construction is shown in FIGS. 4 and 5. As there illustrated, an energy collector or concentrator 62 has a triangular shape in cross section. The concentrator 62 includes a frame 23 having a pair of triangular end sections 51 and 53, respectively. The sections 51 and 53 are identical, and only a single section 51 is described in detail. The section 51 is constructed from a plurality of legs 24, 25 and 26. The legs 24, 25 and 26 of the section 51 are joined to corresponding legs of the section 53 by a plurality of longitudinally extending sides 27, 28 and 29. The sides 27 and 29 are adapted to receive a concentrating means 22 and mount it to the frame 23. The concentrating means 22 has a front face 30. The face 30 preferably is a Fresnel lens configuration of the type described in conjunction with the concentrator embodiment of FIG. 1. A vertex 31 defined by the frame 23 along the side 28 delimits a concentrating area 32. Again, the concentrating area 32 may have a suitable energy conversion means associated with it. A liquid carrying conduit 52 is shown in FIG. 4 for that purpose.

An expansion means 33 extends between the concentrating area 32 and the side 29 of the frame 23. The expansion means 33 has a first end 65 and a second end 66. The end 66 is attached to the side 29 of the frame 23, while the end 65 is fixed, for example, either to a suitable enclosure for the concentrator 62, or to the side 28 adjacent the concentrating area 32. The expansion means 33 includes a curved portion 36 which functions in a manner similar to the curved portion 19 of the concentrating means 2. The side 28 of the frame 23 is pivotally mounted at 34 to permit rotation of the concentrator 62.

Figure 6:
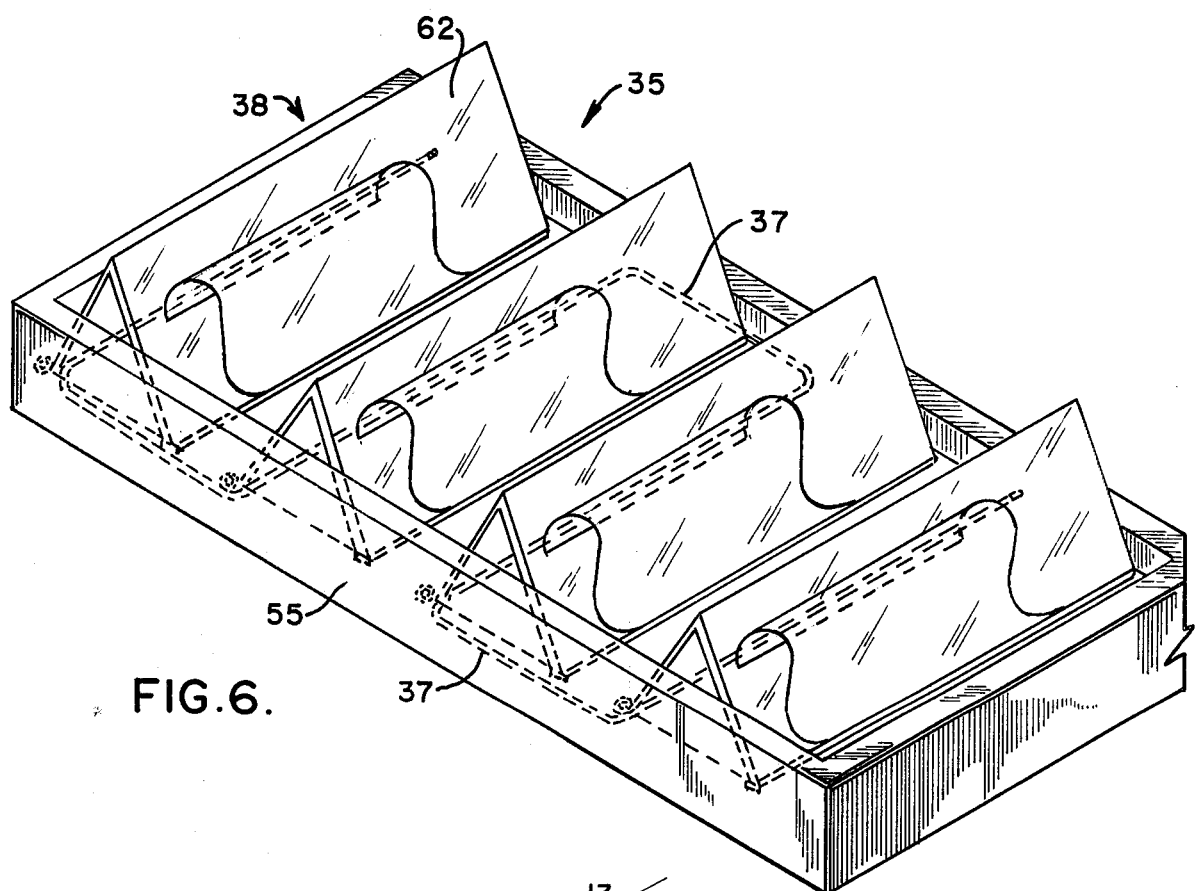
FIG. 6 is a view in perspective of an energy collector element utilizing the energy collector of FIG. 4.

As shown in FIG. 6, a multiplicity of the concentrators 62 may be arranged serially in an energy collector element 38 to define the radiant heater 35. The heater 35 includes a plurality of the concentrators 62 arranged to permit a coil 37 to extend through a series of the concentrating means 62, individual ones of which are arranged parallelwise with respect to one another. The concentrator 62 plurality may be mounted in a suitable enclosure 55. Enclosure 55 is conventional and is not described in detail.

Operation of the concentator 62, individually or with respect to the energy collector element 38, is substantially similar to that described in conjunction with the concentrating means 2. That is, the radiant energy source 21 will direct a ray 14 toward the curved portion of the expansion means 33. As the temperature of the expansion means increases, it expands, rotating the concentrator about its pivot point and aligning the axis of the concentrating means 22 with the energy source 21. Thereafter, the expansion means 33 enables the concentrating means 22 to track the source 21 continuously between suitable, preselected limits.

The embodiments of FIGS. 1 through 8 are designed for single axis tracking of the energy source. The width, thickness, location and number of expanding means used with the embodiments illustrated in those figures, depends on the forces required to lift the concentrating means, which in turn depends upon the size and weight of the concentrating means itself, and whether a counter-weight is utilized with any particular embodiment.

Figure 9:
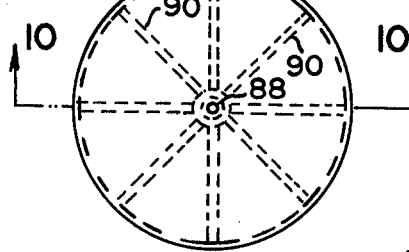
FIG. 9 is a top plan view of a second illustrative embodiment of an energy collector of this invention.
Figure 3:
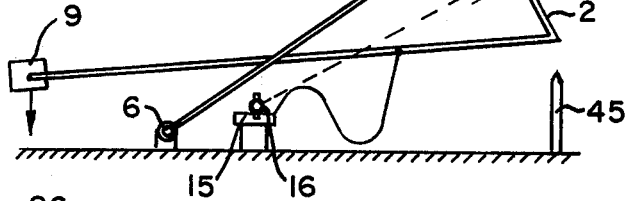
FIG. 3 is a view in side elevation of the concentrator shown in FIG. 1, shown in its aligned position.
Figure 10:
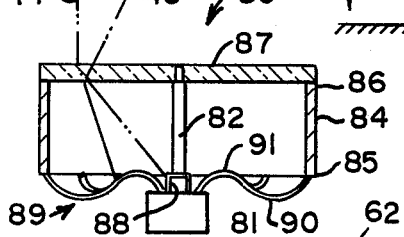
FIG. 10 is a sectional view taken along the line 10—10 in FIG. 10.

FIGS. 9 and 10 illustrate a concentrating means 80 capable of dual axis tracking of an energy source. The concentrating means 80 includes a support structure 81 having a support arm 82 extending upwardly from it. The support structure 81 also has a concentrating area 88 associated with it. The arm 82 has a first end pivotally mounted along the support 81, and a second end attached to a focusing lens 87. The concentrating means 80 also includes a cylindrical side wall portion 84 having a bottom edge 85 and a top edge 86. The top edge 86 supports the focusing lens 87 which preferably is of a flat Fresnel lens construction. The lens 87 is mounted along the edge 86 of the side wall 84 by any convenient method. The concentrating area 88 has a suitable energy conversion device associated with it, which may be similar to those described in conjunction with the embodiment of FIGS. 1-8.

An expansion device 89 is operatively connected between the support structure 81 and the edge 85 of the side wall 84. Expansion device 89 is a spoke arrangement having a plurality of legs 90 extending radially outwardly from the centrally located concentrating area 88 of the support structure 81. Each of the legs 90 includes a curved portion 91. As with the embodiment of FIGS. 1-8, the individual legs 90 of the expansion device 89 are intended to pass concentrated energy from an energy source tangentially along the curved portion 91 in aligned positions of the concentrating means 80, and to direct energy toward respective ones of the legs 90 in disaligned positions of the energy source. In the particular embodiment of FIGS. 9 and 10, the expansion device 89 has six of the legs 90 extending outwardly from the pivotal mounting of the support arm 82 so that the support 82, and consequently the lens 87, has 2° of freedom, enabling the concentrating means 80 to follow energy source movement for both declinational and diurnal movement.

Numerous variations, within the scope of the appended claims, will be apparent to those skilled in the art in light of the foregoing description and accompanying drawings. Thus, the design silhouette of the device may vary considerably in other embodiments of this invention, as may the enclosure containing the concentrating means. While a counter-weight was utilized with the embodiment of FIG. 1, the invention does not require use of a counter-weight in all of its intended forms. Although a lens is the preferred form of concentrating means, those skilled in the art will recognize that a reflector system may be used to accomplish similar results. In like manner, lens arrangements other than Fresnel constructions are compatible with the invention. These variations are merely illustrative.

Having thus described the invention, what is claimed and desired to be secured by Letters Patent is:

1. A solar energy device, comprising:

an energy conversion means positioned at an energy reception area;

a movably mounted energy concentrator adapted to concentrate energy on said reception area; and heat sensitive expansion means operatively connected between said reception area and said movably mounted energy concentrator, said energy concentrator having an aligned position and a disaligned position with respect to said energy reception area, said expansion means expanding and contracting to control movement of said concentrating means, said concentrating means directing energy toward said reception area in said aligned position, and directing energy toward said expansion means in said disaligned position.

2. The device of claim 1 wherein said expansion means has a shape corresponding to the path followed by the point of greatest energy intensity generated by the concentrator as said concentrator moves toward said disaligned position.

3. The device of claim 2 wherein said expansion means comprises a strip of bimetallic material.

4. The device of claim 3 wherein said expansion means has a serpentine design in side elevation.

5. The device of claim 3 wherein said energy concentrating means comprises a Fresnel lens.

6. The device of claim 1 wherein said expansion means comprises a plurality of legs extending radially outwardly from said energy reception area, said energy concentrator being pivotally mounted for movement in at least two planes, said legs being operatively connected to said energy concentrator such that contraction and elongation of said expansion means moves said energy concentrator in said two planes.

7. In a solar energy conversion device including support means, energy concentrating means for concentrating energy, said concentrating means having an axis, energy impinging on said concentrating means parallel to said axis being directed toward a focal point, said energy concentrating means being pivotally mounted so as to permit said concentrating means to follow movement of an energy source in at least one direction of movement of said energy source, and an energy reception area at the focal point of said concentrating means, the improvement which comprises expansion means for driving said concentrating means, said expansion means having a first end and a second end, one of said first and said second ends being attached to said device along said energy reception area and the other of said first and said second ends being operatively connected to said energy concentrating means, said energy concentrating means being adapted to direct energy towards said reception area when said axis is aligned with said energy source, and to said expansion means wherein said axis is disaligned with respect to said energy source.

8. The improvement of claim 7 wherein said expansion means has a shape corresponding to the path followed by the point of greatest intensity generated by the concentrating means as the concentrating means moves toward disalignment with said energy source.

9. The improvement of claim 8 wherein said expansion means comprises a strip of bimetallic material.

10. The improvement of claim 9 wherein said expansion means has a serpentine design in side elevation, said serpentine design including at least one curved portion near said energy reception area.

11. In a solar conversion device including a concentrator movable so as to follow the motion of an energy source, said concentrator having at least an aligned position and a disaligned position with respect to said energy source, the improvement which comprises temperature responsive means for aligning said concentrator with said energy source, said temperature responsive means comprising a length of material, said material expanding when heated, said material having an end operatively connected to said energy concentrator, and a predetermined shape positioned to receive concentrated energy from said concentrator in said disaligned position, said shape preventing the reception of a significant amount of concentrated energy said temperature responsive means in said aligned position.

12. The improvement of claim 11 wherein said expansion means has a shape corresponding to the path followed by the area of greatest energy intensity generated by the concentrator as the concentrator moves toward said disaligned position.

13. The improvement of claim 12 wherein said expansion means has a serpentine design in side elevation.

14. The device of claim 13 wherein said expansion means comprises a strip of bimetallic material formed in said serpentine design.

15. The improvement of claim 14 wherein said energy concentrator comprises a Fresnel lens.

16. A solar energy device, comprising:
an enclosure;
a plurality of energy conversion devices mounted in said enclosure, each of said energy conversion devices including:
   an energy concentrator movably mounted to said enclosure, said energy concentrator having an aligned position and a disaligned position with respect to a source of energy; and
   a temperature responsive means for aligning said concentrator with a source of solar energy, said temperature responsive means comprising a length of material, said material expanding when heated, said material having an end operatively connected to said energy concentrator so that expansion and contraction of said material positions said concentrator, said material having a predetermined shape including at least a curved portion adapted to receive concentrated energy from said energy concentrator in at least the disaligned position of said concentrator; and
energy conversion means positioned to receive concentrated energy from said energy concentrator in at least the aligned position of said energy concentrator.

17. The solar energy device of claim 16 wherein said temperature responsive means has a predetermined shape such that the temperature responsive means gives relatively large movement with relatively small energy input at the aligned position of each of said energy concentrators, the shape of the temperature responsive means at other than the aligned position of said energy concentrator being such as to receive energy from the concentrator, thereby causing the temperature responsive means to move the concentrator back toward its aligned position.

18. The solar energy device of claim 16 wherein said temperature responsive means comprises a strip of bimetallic material.

19. A solar energy device, comprising:
a structure defining an energy reception area;
an energy concentrator movably mounted about said energy reception area; and heat sensitive expansion means operatively connected between said reception area and said energy concentrator, said energy concentrator having an aligned position and a disaligned position with respect to said energy reception area, said expansion means contracting and elongating to control movement of said concentrating means, said concentrating means directing energy toward said reception area in said aligned position, and directing energy toward said expansion means in said disaligned position.

20. The device of claim 19 wherein said energy concentrator is mounted for movement in at least two planes about said energy reception area, said expansion means comprising a plurality of legs extending radially outwardly from said energy reception area, said legs being operatively connected to said energy concentrator so that contraction and elongation of said expansion means permits movement of said energy concentrator in said two planes.

21. The device of claim 19 wherein said expansion means has a predetermined shape such that the expansion means gives relatively large movement with relatively small energy input at the aligned position of said concentrator, the shape of said expansion means at other than the aligned position of said energy concentrator being such as to receive energy from the concentrator, thereby causing the expansion means to move the concentrator back toward its aligned position.

* * * * *

UNITED STATES PATENT AND TRADEMARK OFFICE
CERTIFICATE OF CORRECTION

PATENT NO. : 4,091,799

DATED : May 30, 1978

INVENTOR(S) : Robert E. Steiner

It is certified that error appears in the above-identified patent and that said Letters Patent are hereby corrected as shown below:

Column 4, line 22, "thereby" should be "thereto".

Column 4, line 47, "as" should be "an".

Column 8, line 12, "energy said" should be "energy by said".

Signed and Sealed this

Thirteenth Day of February 1979

[SEAL]

Attest:

RUTH C. MASON
Attesting Officer

DONALD W. BANNER
Commissioner of Patents and Trademarks